Dec. 5, 1950     C. WARE     2,532,686

SAFETY JOINT

Filed Sept. 18, 1945

Inventor
Cecil Ware

By E. V. Hardway,
Attorney

Patented Dec. 5, 1950

2,532,686

UNITED STATES PATENT OFFICE 2,532,686

SAFETY JOINT

Cecil Ware, Houston, Tex.

Application September 18, 1945, Serial No. 617,099

3 Claims. (Cl. 255—28)

This invention relates to a safety joint.

An object of the invention is to provide a safety joint, or tubing parting joint, of the character described which may be readily separated.

Another and more specific object of the invention is to provide a safety joint embodying an internally threaded female member and an externally threaded male member with an expander for normally holding the male member expanded so that the threads of the male member will intermesh with the threads of the female member when said members are screwed together said expander being movable independent of the sale member to permit the threaded portion of the male member to contract and disengage the threads whereby said members may be readily separated.

The joint hereindescribed is particularly applicable to a drill stem or other tubular string of pipe in a well and which is releasable for separation of the stem or string in case the tool or other appliance to which the string is connected becomes stuck in a well bore.

The safety joint is usually incorporated into the drill stem above the drill, or into the string of pipe above the packing or other well appliance so that in case the drill packing or other appliance should become stuck in the well and cannot be withdrawn the stem or string may be separated and thus withdrawn from the well and saved.

It is a further object of the invention to provide a safety joint, or tubing parting joint, that may be released by dropping an impact member through the stem or string to release the expander and permit the externally threaded pin of one joint member to contract and release the threads of the other joint member.

With the above and other objects in view the invention has particular relation to certain novel features of construction, arrangement of parts and use, an example of which is given in this specification and illustrated in the accompanying drawings, wherein.

Figure 1:
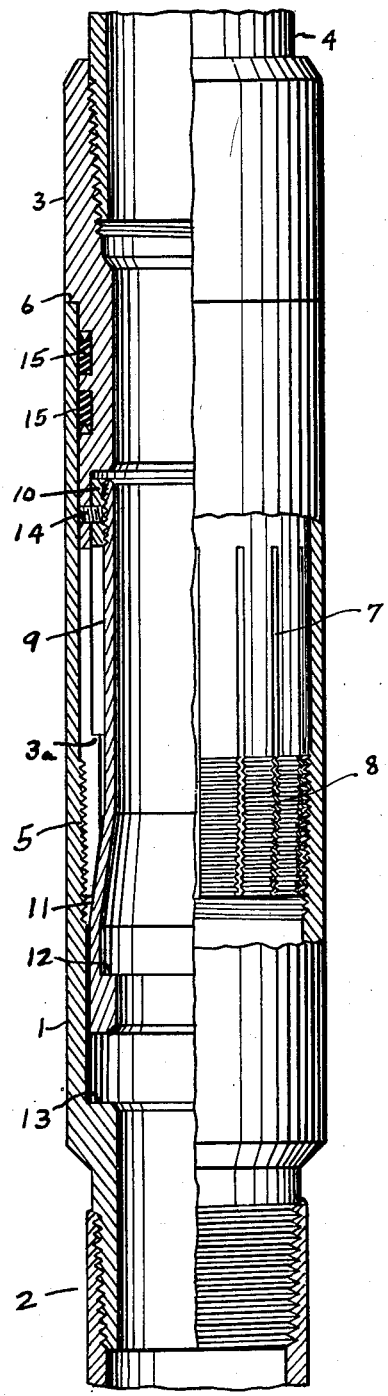
Figure 1 is a side view of the joint, partly in section, showing the two members of the joint connected together.

In the drawings the numeral 1 designates a tubular box member whose lower end, in the present illustration, is shown connected to a lower tubular section 2 which may be connected to the drill, well packing or other appliance.

The numeral 3 designates the pin member as a whole whose upper end may be connected to the drill stem 4 or other tubular string.

As illustrated the upper end of the box member is blank internally and beneath said blank portion it is provided with the internal threads 5. The pin member may be provided with an external annular shoulder 6 against which the free end of the box member abuts when the members are assembled.

The reduced lower end of the pin member is provided with the longitudinal slits 7 thus forming an expansible pin whose extreme end is provided with the external threads 8 adapted to intermesh with the threads 5 when the parts are screwed together. Thus the slitted portion, is resilient and when in unstressed or normal condition it is sufficiently smaller than the threaded box member to free the threads.

The numeral 9 designates a tubular expander one end of which has an external collar 10, screwed thereon or formed integrally therewith, and which has a flared portion 11 adapted to fit within and expand the outwardly threaded pin of the pin member 3.

The lower end of the expander 9, beneath the flared portion 11 is inwardly thickened forming an internal annular upwardly facing shoulder 12 forming an impact face.

The lower end of the box member may be inwardly thickened and provided with an inside upwardly facing shoulder 13 which is spaced beneath the lower end of the expander when the parts are assembled.

Normally the external diameter of the threaded portion of the pin member is less than the internal diameter of the threaded portion of the box member.

In assembling the safety joint the expander 9 is inserted into the threaded end of the pin member until the flared portion 11 of the expander expands the pin member to the required diameter so that the threads of the pin member will intermesh with the threads of the box member and the expander is then anchored in that position by means of a shearable pin 14 which is screwed through the pin member, above the slots 7, and into the collar 10, or outwardly thickened portion of the expander.

The pin member may be then screwed into the box member in the usual way.

If desired seal rings, as 15, may be countersunk into the pin member just beneath the shoulder 6 so as to form effective seals between said members when the parts are screwed home.

If the drill, packing, or other well appliance to which the drill stem or operating string is connected should become stuck in the well and cannot be removed an impact tool may be dropped through the stem or string and will land on the face 12 causing the pin 14 to break and the expander to move downwardly to release the pin so that it will contract and disengage said threads allowing the joint to separate and the stem or string to be removed from the well. Should the threads not completely disengage, upon downward movement of the expander, when a pull is taken on the drill stem 4 the co-acting sloping sides of the threads 8 against the corresponding sloping sides of the threads 5 will cause said threads to disengage to permit separation of the joint.

Figure 2:
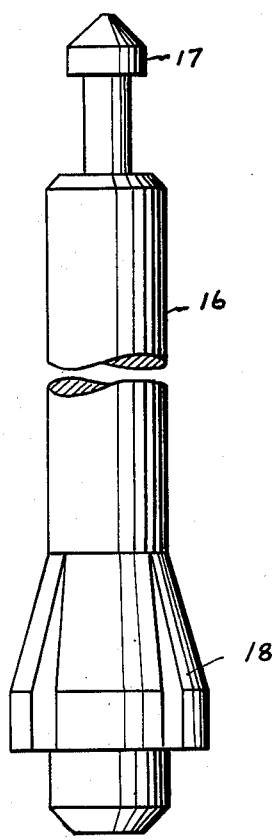
Figure 2 is a side view of an impact tool designed for use in releasing the joint.
Figure 3:
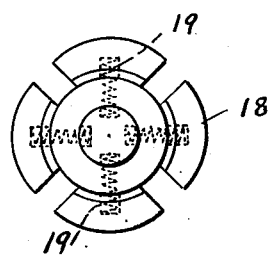
Figure 3 is a bottom end view of said tool.

It will be noted that the pin has the internal upwardly facing shoulders 3a and as the separated stem or string is pulled upwardly these will engage the lower end of the collar 10 so that the expander will be withdrawn with the stem or string. A preferred form of impact tool is shown in Figures 2 and 3 wherein the numeral 16 designates a cylindrical body of the required weight and whose upper end has a head 17 adapted for the engagement of a grappling tool therewith. This tool may be connected to the lower end of a cable in the well known manner. The lower end of the body 16 has the hammers 18 supported thereon and arranged therearound and normally held expanded by the pressure springs 19 which normally hold said hammers expanded, or in their outer position. When the impact member is dropped through the stem or string the hammers will be held contracted or in their inner position and when they reach the outwardly flared portion 11 of the expander 9 they will expand outwardly and their lower ends will strike against the impact face 12 with sufficient force to shear the pin 14 and drive the expander downwardly to release the expansible pin and allow it to contract. This tool will hang on the shoulder 12 and will be withdrawn from the well with the stem or string.

The impact tool may be connected to a cable before it is lowered and then dropped through the string or stem and when it lands on the impact face 12 if the pin 14 should not be broken the impact tool may be alternately lifted and dropped until the pin 14 is broken and the expander released.

In some cases the impact, or release, tool may be lowered through the stem or string onto the face 12, without releasing the expander and in such case fluid pressure may be applied against the release tool by a pump at the ground surface of sufficient force to release the expander 9 to allow the pin, of the pin member 3, to contract.

It is also possible to dispense with the frangible pin 14 and depend on the friction of the pin member 3, against the flared portion of the expander to hold the expander in place.

The drawings and description are illustrative merely while the broad principle of the invention will be defined by the appended claims.

What I claim is:

1. A safety joint comprising, an internally threaded box member, a longitudinally slitted pin member having an externally threaded expansible pin whose threads intermesh with the threads of the box member, an expander releasably secured in the pin member expanding the same so that its threads will intermesh with the threads of the box member when the pin is in expanded position in the box member, an internal shoulder forming an impact face on the expander disposed to receive an impact tool for releasing the expander to allow the pin to contract and release said intermeshing threads.

2. A safety joint for connecting two tubular sections comprising, a box member having internal threads on one of said sections, a pin member having an expansible externally threaded pin on the other section, said pin being provided with longitudinal slits, an expander in the pin member, a shear-pin anchoring the expander to the pin member means on said expander engaging said pin to expand the pin so that the threads on the pin will mesh with the threads in the box when the pin is in expanded position in the box member, an internal shoulder on the expander positioned to receive an impact from an impact delivering means operable in said pin to break the shear-pin and release the expander to allow said pin to contract and break the joint.

3. A safety joint comprising, an internally threaded box member, a pin member having an expansible, externally threaded longitudinally slitted pin, an expander anchored in the pin member and expandably engaging said pin to hold the pin expanded so that its threads will mesh with the threads of the box member, an internal shoulder forming an impact face on the expander disposed to receive an impact tool operating through the safety joint to release said expander from expanding engagement with said pin.

CECIL WARE.

REFERENCES CITED

The following references are of record in the file of this patent:

UNITED STATES PATENTS

| Number | Name | Date |
|---|---|---|
| 1,101,234 | Baker | June 23, 1914 |
| 1,815,660 | Walker | July 21, 1931 |
| 1,833,040 | Rader | Nov. 24, 1931 |
| 1,883,071 | Stone | Oct. 18, 1932 |
| 2,092,822 | West | Sept. 14, 1937 |
| 2,202,261 | Osmun | May 28, 1940 |